United States Patent Office 2,959,767
Patented Nov. 8, 1960

2,959,767

DEVICE FOR INDICATING VARIATIONS IN CODED INFORMATION

Rudolf Wasser, Zurich, Switzerland, assignor to North American Philips Company, Inc., New York, N.Y., a corporation of Delaware Filed Mar. 27, 1958, Ser. No. 724,420

15 Claims. (Cl. 340—147)

The invention relates to a device for indicating variations in coded information; the device contains a plurality of inputs to which simultaneously occurring unipolar code pulses are supplied in accordance with the coded information.

Such devices are used, inter alia with calculating machines. To the device is applied, in succession, a series of coded information, each of which is characteristic of given data or a given operation, recorded somewhere in the machine or taking place therein. The device does not respond as long as these successive data or operations are the same, i.e. as long as the information does not vary; however, as soon as there occurs a variation in the information with respect to the immediately preceding information supplied to the device, the device supplies a signal.

Such devices may be composed of electron tubes or transistors, however, they then have the disadvantage that during operation they require a continuous energy supply; moreover, when the energy supply ceases to operate, the information assembled in the device for comparison is destroyed.

The invention has for its object to provide a device of very simple and cheap construction, in which the aforesaid disadvantages are obviated.

The device according to the invention has the feature that the inputs thereof are connected to conductors, which are inductively coupled with cores consisting of ferromagnetic material having an approximately parallelogram-shaped hysteresis loop, these cores being shifted by the code pulses into one remanence condition, while in a number of these cores, during the occurrence of the code pulses, other pulses are generated which, if only they are operative, cause the remanence condition of the cores concerned to change its polarity in a manner such that upon a variation of the coded information at least one of the cores changes its remanence condition, so that a voltage pulse is produced in a reading winding provided on the cores, which is coupled via a rectifier with an output terminal.

The invention will be described more fully with reference to the figures of the drawing, which show embodiments of the device according to the invention. In the figures.

Figure 1:
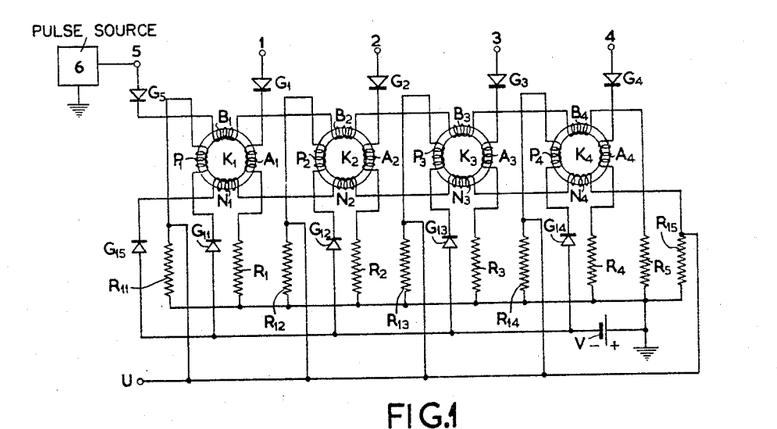
Figure 1 is a circuit diagram of one embodiment of the invention.

Fig. 1 shows a device according to the invention to indicate variations in coded information, which is composed of four code elements. Each code element can assume two values, which may, for example, be indicated by "0" and "1." "0" may, for example, be characterized by the failing of a current or voltage pulse and "1" by the presence of a current or voltage pulse. These current or voltage pulses are unipolar, i.e. all pulses when present have the same sense. In the embodiment shown these four code elements of simultaneous occurrence form a particular piece of coded information.

Each of these code elements is applied to an input of the indicating device. These inputs are indicated in Figure 1 by 1, 2, 3 and 4 respectively. These inputs are connected to earth via rectifiers $G_1$, $G_2$, $G_3$ and $G_4$ respectively, windings $A_1$, $A_2$, $A_3$ and $A_4$ respectively and resistors $R_1$, $R_2$, $R_3$ and $R_4$ respectively. The windings $A_1$, $A_2$, $A_3$ and $A_4$ are inductively coupled with cores $K_1$, $K_2$, $K_3$ and $K_4$ respectively. Each of these cores consists of a ferromagnetic material having an approximately parallelogram-shaped hysteresis loop. It is known that such a core can have two remanence conditions, both of which are stable. By means of current pulses of suitable polarity passing through a conductor inductively coupled with the core such a core can be shifted from one remanence condition into the other.

An input 5 is connected to earth through a rectifier $G_5$, the series combination of a winding $B_1$, $B_2$, $B_3$ and $B_4$ and a resistor $R_5$. To the input 5 is applied the output signal of a pulse source 6. The windings $B_1$, $B_2$, $B_3$ and $B_4$ are also inductively coupled with cores $K_1$, $K_2$, $K_3$ and $K_4$ respectively.

The rectifiers $G_1$, $G_2$, $G_3$, $G_4$ and $G_5$ serve to prevent a current pulse operative across one of the windings $A_1$, $A_2$, $A_3$ or $A_4$ and the series combination of the windings $B_1$, $B_2$, $B_3$ and $B_4$ from reacting on the other windings $A_1$, $A_2$, $A_3$ and $A_4$ or on the said series combination. If the sources producing the code pulses and the pulse source 6 have the nature of current sources, the use of these rectifiers may be omitted.

The core $K_1$ is connected, furthermore, via an output winding $P_1$ through a rectifier $G_{11}$ and a resistor $R_{11}$ to an output U. In the same way the cores $K_2$, $K_3$ and $K_4$ are connected via output windings $P_2$, $P_3$ and $P_4$ respectively through rectifiers $G_{12}$, $G_{13}$ and $G_{14}$ respectively and resistors $R_{12}$, $R_{13}$ and $R_{14}$ respectively to this output U. Finally the cores are also connected to this output U via windings $N_1$, $N_2$, $N_3$ and $N_4$, which are connected in series, through a rectifier $G_{15}$ and a resistor $R_{15}$. The rectifiers are connected so that across the resistors $R_{11}$, $R_{12}$, $R_{13}$, $R_{14}$ and $R_{15}$ only positive voltages can occur. The windings $P_1$, $P_2$, $P_3$ and $P_4$ are arranged on the cores in a manner such that for example only the voltages produced at a change of a core from the negative remanence condition into the positive remanence condition can render the rectifiers $G_{11}$, $G_{12}$, $G_{13}$ and $G_{14}$ conductive. The windings $N_1$, $N_2$, $N_3$ and $N_4$ are then arranged on the cores in a manner such that only the voltages produced at the change of a core from the positive remanence condition into the negative condition can render conductive the rectifier $G_{15}$.

When the coded information is supplied to the inputs 1, 2, 3 and 4, a pulse is simultaneously applied to the input 5 of the device, which pulse originates from the source 6. It is assumed that the magnetic field produced by the pulse applied to the input 5 if this field alone is operative in a core, shifts this core from the positive into the negative remanence condition. The magnetic fields produced in the cores by the code pulses have at least twice the amplitude of the magnetic field produced by the pulse applied to the input 5 and have, moreover, a sense opposite to that of the latter magnetic field.

The device shown in Fig. 1 operates as follows: It is assumed that the coded information can be indicated at a given instant by the aforesaid notation, of, for example, (1, 1, 0, 0). This means that there occur simultaneously at the inputs 1 and 2 pulses of identical sense, whilst at the inputs 3 and 4 no pulses occur. At the same time that the coded information is supplied to inputs 1–4, the input 5 has a pulse applied to it. In each of the cores $K_1$ and $K_2$ two magnetic fields are produced, one by the current pulse applied to the input 1 and 2 respectively, the other by the current pulse applied to the input 5. Since the first-mentioned magnetic field is at least twice the latter and has, moreover, a sense opposite to that of the latter, the magnitude and the sense of the resultant field are such that the cores 1 and 2 are driven into the positive remanence condition or, if they are already in this condition, remain in the positive remanence condition.

The cores 3 and 4 are, however, only acted upon by the current pulse applied to the input 5, so that they are driven into or remain in the negative remanence condition.

A further piece of coded information, which is also characterized by (1, 1, 0, 0), with a pulse again being simultaneously applied to the input 5, will not vary the condition of the cores.

Apart from the comparatively small flux variations occurring in the cores, since they approach the saturation by the said magnetic fields, substantially no flux variations result from the second piece of coded information and substantially no voltages are induced across the windings $P_1$, $N_1$, $P_2$, $N_2$ and so on, coupled with the cores.

Consequently, as long as the coded information is, in succession characterized by (1, 1, 0, 0), no signal occurs across the output. The feeble voltages occurring owing to the approach of saturation of the cores during the occurrence of the pulses applied to the inputs 1, 2, 3, 4 and 5 and having all the same polarity owing to the rectifiers $G_{11}$, $G_{12}$, $G_{13}$, $G_{14}$ and $G_{15}$, can be made inoperative across the output U by a suitable threshold thereon. This may, as an example, be achieved by providing a negative bias voltage for the rectifiers $G_{11}$, $G_{12}$, $G_{13}$, $G_{14}$ and $G_{15}$ from a voltage source V, which may, if desired, be common to them.

It is now assumed that the coded information varies at a given instant from (1, 1, 0, 0) into (1, 1, 1, 0). During the occurrence of the last-mentioned information and the pulse applied simultaneously to the input 5, the cores $K_1$, $K_2$ and $K_4$ are further saturated and do not vary their condition. The core $K_3$, however, changes from the negative condition into the positive condition, since the pulse then applied to the input terminal 3, in spite of the pulse occurring across the winding $B_3$, produces a sufficiently large magnetic field to produce this change-over. Owing to this change-over a considerable flux variation occurs and induces across the windings $P_3$ and $N_3$ material pulsatory voltages. Since the winding $P_3$ is arranged on the core in a manner such that the voltage produced during the change-over of the core from the negative remanence condition into the positive remanence condition renders the rectifier $G_{13}$ conductive and the winding $N_3$ is arranged on the core in a manner such that the voltage produced at the change-over of the core from the positive into the negative remanence condition renders the rectifier $G_{15}$ conductive, the resistor $R_{13}$ and hence the output U have a positive voltage, which serves as an indication of the change occurring in the coded information.

As long as the coded information remains characterized by (1, 1, 1, 0), no signal occurs across the output. If the information changes at a given instant into (1, 0, 1, 0) the condition of the core $K_2$ changes, since in this core only the magnetic field of the pulse applied to the input 5 is operative, so that the core $K_2$ changes over from the positive into the negative remanence condition. Since the winding $P_2$ is arranged on the core in a manner such that the voltage produced at a change-over of the core from the negative into the positive remanence condition, renders the rectifier $G_{12}$ conductive and the winding $N_2$ is arranged on the core in a manner such that the voltage, in the inverse condition, renders the rectifier $G_{15}$ conductive, the resistor $R_{15}$ and hence the output U have a positive voltage.

When the coded information varies from (1, 0, 1, 0) into for example (1, 1, 0, 0), the conditions of both core $K_2$ and core $K_3$ change. The voltage across the winding $N_3$, occurring due to the change-over of the core $K_3$ and capable of rendering the rectifier $G_{15}$ conductive, is then, however, compensated by the opposite voltage across the winding $N_2$, which is produced by the change-over of the core $K_2$. Thus, across the resistor $R_{15}$ no voltage occurs. Neither does a voltage occur across the resistor $R_{12}$, since the voltage across the winding $P_2$ cannot render the rectifier $G_{12}$ conductive. This does not, however, apply to the resistor $R_{13}$, since the voltage across the winding $P_3$ produced by the change-over of the core $K_3$ from the negative into the positive remanence condition can render the rectifier $G_{13}$ conductive. Also in this case the output U has a positive voltage, which serves as an indication of the variation in the coded information.

The fact that all variations in the coded information produce an output signal across the output U is due to the fact that each core has, not only a common output circuit $G_{15}$–$R_{15}$, but also a separate output circuit $G_{11}$–$R_{11}$ or $G_{12}$–$R_{12}$ and so on respectively. This may also be achieved by providing each core with two separate output circuits, one responding to a change-over of the core from the positive into the negative remanence condition and one responding to a change-over from the negative into the positive remanence condition. The number of required rectifiers is then, however, substantially twice that of the embodiment shown (8 instead of 5; in general, $2n$ instead of $n+1$, if $n$ designates the number of cores).

It should be noted that if both for the change-over from the positive into the negative remanence condition of the cores and for the change-over from the negative into the positive remanence condition a circuit common to all cores were used, variations in the coded information, in which the number of code elements "1" changing over into "0" is equal to the number of code elements "0" changing into "1" and the voltages then occurring could compensate one another.

Figure 2:
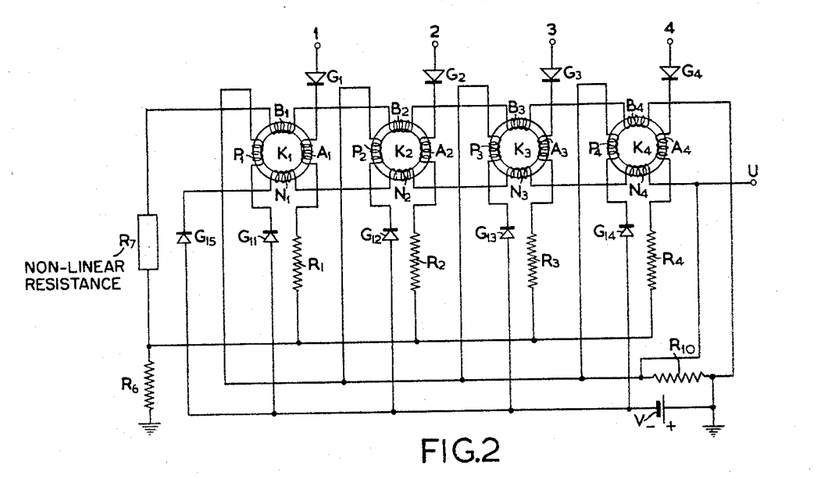
Figure 2 is a modification of the circuit of Fig. 1 in which the need for a separate pulse source is obviated.

Fig. 2 shows a device according to the invention, in which the pulse supplied to all cores simultaneously with the coded information need not be supplied by a separate source, but is produced by the coded information itself. The corresponding elements of the devices shown in Figs. 1 and 2 are designated by the same reference numerals.

In the device shown in Fig. 2 the windings $A_1$, $A_2$, $A_3$ and $A_4$ are connected via resistors $R_1$, $R_2$, $R_3$ and $R_4$ respectively and the rectifiers $G_1$, $G_2$, $G_3$ and $G_4$ respectively, through a resistance network $R_6$, $R_7$ to the series combination of the windings $B_1$, $B_2$, $B_3$ and $B_4$. As soon as a code pulse is applied to an input terminal 1, 2, 3, or 4, a current pulse traverses this series combination.

The resistance network $R_6$, $R_7$ is proportioned to be such that under the action of a current pulse supplied to an input terminal a current pulse passes through the windings $B_1$ and so on, which produces, in a core, a magnetic field, which is not greater than half the magnetic field produced by the current pulse across the winding $A_1$, $A_2$, $A_3$ or $A_4$. The resistor $R_7$ is a non-linear current-limiting resistor, which provides that, even if a code pulse is supplied to more than one input terminal, the magnitude of the current pulses passing through the series combination of the windings $B_1$, $B_2$, $B_3$ and $B_4$ does not exceed the value in the case when a code pulse is supplied to only one input.

The rectifiers $G_1$, $G_2$, $G_3$ and $G_4$ serve again to prevent a reaction of a current pulse passing through one of the windings $A_1$, $A_2$, $A_3$ or $A_0$ on the other windings.

It will be obvious that in the device shown in Fig. 1 the resistors $R_{11}$ to $R_{15}$ may be replaced, if desired, by one common resistor. In Fig. 2 these resistors are replaced by the common resistor $R_{10}$.

It will be obvious that the current limitation may be achieved in a manner differing from that obtained by means of the network $R_6$—$R_7$. The voltage across the resistor $R_6$ may, for example, be supplied to the control-electrode of an amplifying element, which is adjusted in a manner such that it has its maximum output amplitude at the occurrence of a single current pulse at the inputs 1, 2, 3 or 4, so that at arbitrarily coded information a constant current pulse is supplied through the series combination of the windings $B_1$, $B_2$, $B_3$ and $B_4$.

Figure 3:
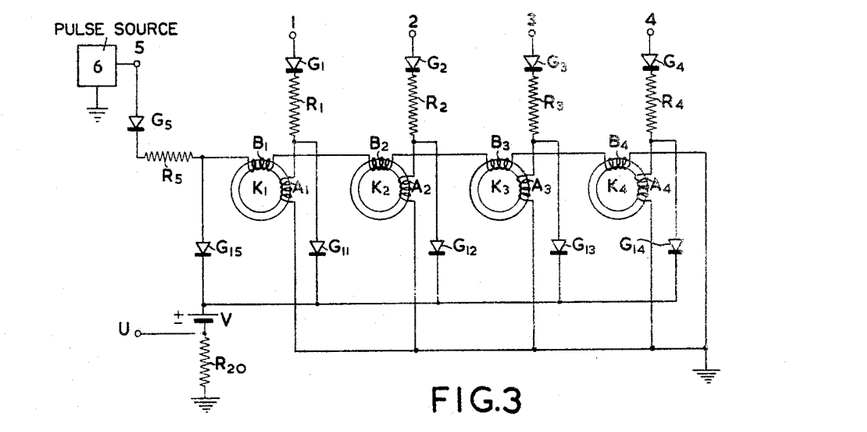
Fig. 3 is a modification of Fig. 1 in which certain windings are eliminated.

Fig. 3 shows one embodiment of a device according to the invention, which is primarily identical with that of Fig. 1, but in which no separate circuits $N_1$, $P_1$ $N_2$, $P_2$ and so on are used for the output circuit. In this case each of the windings $A_1$, $A_2$, $A_3$ and $A_4$ and also the series combination of the windings $B_1$, $B_2$, $B_3$ and $B_4$ are connected in parallel with a rectifier $G_{11}$, $G_{12}$, $G_{13}$, $G_{14}$ and $G_{15}$ respectively and a resistor, in this case, a common resistor $R_{20}$. The operation of this output circuit is based on the fact that the self-inductance of the winding can be substantially neglected, if the associated core does not change over during a current pulse supplied to an input, so that the winding operates as a short-circuit, whereas it exhibits a material inductance, if the associated core changes over from one remanence condition into the other under the action of a current pulse supplied to an input, so that a current division occurs between such a winding and the associated parallel combination of rectifier and resistor. In this case an indication voltage occurs across the resistor, in this case, $R_{20}$. Owing to the rectifiers $G_{11}$, $G_{12}$, and so on this indication voltage always has the same polarity. The direct voltage source V serves to compensate the feeble voltages occurring at the further approach of saturation of the cores.

From the foregoing it is evident that in the devices shown in Figs. 1 and 2, if the number of elements of the coded information is $n$, the number of required cores is also $n$ and the number of rectifiers required for reading is $n+1$. The rectifiers are more costly than the cores and if $n$ is high, the cost of the rectifiers becomes predominant.

In order to avoid this disadvantage, the invention provides a solution in which the number of rectifiers required for reading, irrespective of the number of elements of the coded information, does not exceed the number 4. The number of cores, however, increases substantially to the square, whilst, moreover, the wiring is less simple.

Figure 4:
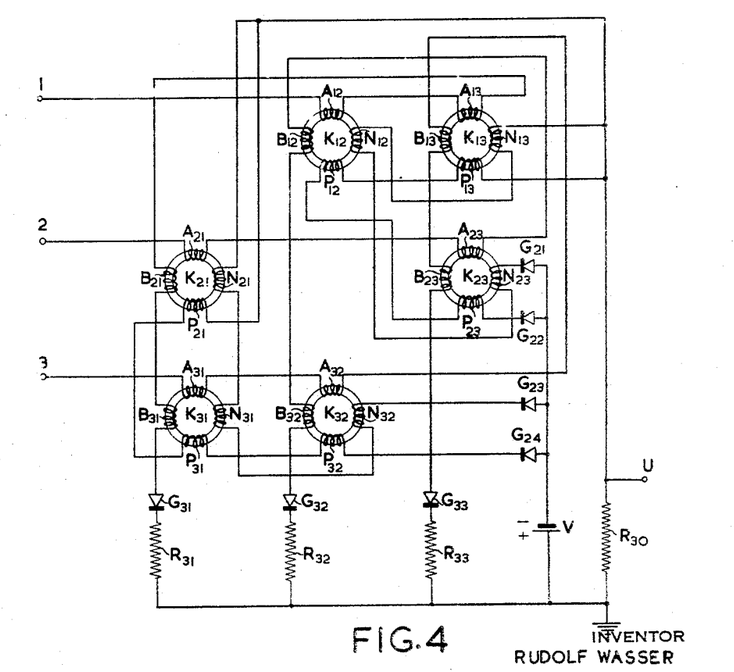
Fig. 4 is a circuit diagram of another embodiment of the invention wherein the need for a large number of rectifiers is eliminated.

The device is built up, or may be considered to be built up, from a bidimensional pattern of cores, with a number of rows and columns, equal to the number of code elements of the coded information, the cores on one diagonal being, however, superfluous. Fig. 4 shows such a device for information consisting of three code elements. $K_{12}$, $K_{13}$, ... $K_{21}$ designate the cores. Since the device is for the sake of simplicity, intended for coded information consisting of three code elements, the pattern containing the cores has three rows and three columns; no cores lie on the main diagonal of the pattern.

With the aid of the windings $A_{12}$ and $A_{13}$ the input 1 is coupled with all the cores of the first row and, with the aid of the windings $B_{21}$ and $B_{31}$, with all the cores of the first column. The windings $A_{12}$, $A_{13}$, $B_{21}$ and $B_{31}$ are connected to earth via a resistor $R_{31}$ and a rectifier $G_{31}$.

In a similar manner the input 2 is coupled with all the cores of the second row and also with all the cores of the second column and the input 3 is coupled with all the cores of the third row and also with all the cores of the third column.

The ratio between the number of turns of the windings $A_{12}$, $A_{13}$ and so on and the number of turns of the windings $B_{12}$, $B_{13}$ and so on is such that the amplitude of the magnetic fields produced by a current across the windings $A_{12}$, $A_{13}$ and so on is at least twice that of the magnetic fields produced by the same current across the windings $B_{12}$, $B_{13}$ and so on. Moreover, the sense of winding of the windings is such that the magnetic fields produced by the unipolar current pulses supplied to the inputs 1, 2 and 3 with the aid of the windings $A_{12}$, $A_{13}$ and so on are opposite the magnetic fields produced by these current pulses with the aid of windings $B_{12}$, $B_{13}$ and so on.

Moreover, all cores lying on one side of the non-occupied diagonal such as cores, $K_{12}$, $K_{13}$ and $K_{23}$ are provided with the series-connected windings $P_{12}$, $P_{13}$ and $P_{23}$, and $N_{12}$, $N_{13}$ and $N_{23}$. Both the series combination of the windings $P_{12}$, $P_{13}$ and so on and of the windings $N_{12}$, $N_{13}$ and so on are connected on the one hand through a rectifier $G_{22}$ and $G_{21}$ respectively to the negative terminal of a voltage source V, which supplies a bias voltage for the rectifiers in the blocking direction, and on the other hand connected to earth through a common resistor $R_{30}$.

Similarly, all cores lying on the other side of the non-occupied diagonal, i.e. the cores $K_{21}$, $K_{31}$ and $K_{32}$, are provided with the series-connected windings $P_{21}$, $P_{31}$ and $P_{32}$ and $N_{21}$, $N_{31}$ and $N_{32}$ respectively. Also these two series combinations are connected on the one hand through rectifiers $G_{24}$ and $G_{23}$ respectively to the negative terminal of the voltage source V and on the other hand to earth through the resistor $R_{30}$.

The rectifiers $G_{21}$, $G_{22}$, $G_{23}$ and $G_{24}$ are arranged so that across the resistor $R_{30}$ only positive voltages can occur. The windings $P_{12}$, $P_{21}$, $P_{13}$, $P_{31}$ and so on are arranged on the cores in a manner such that only the voltages produced at a change-over of a core from the negative remanence condition to the positive remanence condition can render the rectifiers $G_{22}$ and $G_{24}$ respectively conductive. The windings $N_{12}$, $N_{21}$, $N_{13}$, $N_{31}$ and so on are arranged on the cores in a manner such that only the voltages produced at the changeover of a core from the positive remanence condition to the negative remanence condition can render the rectifiers $G_{21}$ and $G_{23}$ respectively conductive.

The output voltage of the device is obtained from the output terminal U across the resistor $R_{30}$.

The device shown in Fig. 4 operates as follows: It is assumed that all the cores are in the negative remanence condition. The coded information then applied to the device is, for example (1, 1, 0). Consequently, only the terminals 1 and 2 obtain a current pulse. It is assumed that the current pulses passing through the windings $A_{12}$, $A_{13}$ and so on changes a core into the positive remanence condition. In the present case the current pulse applied to the terminal 1 passes through the windings $A_{12}$, $A_{13}$, $B_{21}$, $B_{31}$ and the current pulse applied to the terminal 2 passes through the windings $A_{21}$, $A_{23}$, $B_{12}$, $B_{32}$. Since the current pulses passing through the windings $A_{12}$, $A_{13}$, $A_{21}$, $A_{23}$ produce a magnetic field in a core which is twice that produced by the current pulses passing through the windings $B_{21}$, $B_{31}$, $B_{12}$, $B_{32}$, the cores $K_{12}$, $K_{13}$, $K_{21}$ and $K_{23}$ obtain the positive remanence condition. All the other cores remain in the negative condition. The cores $K_{31}$ and $K_{32}$ are affected, it is true, by the current pulses passing through the windings $B_{31}$ and $B_{32}$, but the magnetic fields produced by them urge the cores only further into the negative remanence condition.

Owing to the change-over of the aforesaid cores, the various P-windings, have produced across them voltages which render both the rectifier $G_{22}$ and the rectifier $G_{24}$ conductive. Consequently, across the resistor $R_{30}$ and hence at the output U an indication voltage occurs.

As long as the coded information remains characterized by (1, 1, 0) the condition of the various cores is not varied. The feeble voltages produced by the further saturation of the cores during the repeated occurrence of this information are rendered inoperative by the bias voltage V of the rectifiers $G_{21}$, $G_{22}$, $G_{23}$ and $G_{24}$.

If the positive remanence condition of a core is designated by p and the negative by n, the condition of the device shown in Fig. 4 may be indicated as follows:

When the coded information varies from (1, 1, 0) for example into (1, 0, 0), the diagram given above changes, as will be obvious, into:

The core $K_{21}$ has then changed its remanence condition, i.e. from the positive into the negative condition.

Consequently, through the windings $P_{21}$ and $N_{21}$ voltages occur, of which only the voltage through $N_{21}$ can render the associated rectifiers $G_{23}$ conductive. Thus a positive voltage occurs across the resistor $R_{30}$ and is obtained as an indication voltage from the terminal U.

The further information supplied to the device may be characterized, for example by (0, 1, 1). The condition of the device is then determined by the following diagram:

A comparison with the preceding condition shows that all cores, with the exception of $K_{23}$, have changed their conditions. The change of remanence condition in the cores $K_{12}$ and $K_{13}$ produces voltages through the windings $N_{12}$ and $N_{13}$, these voltages rendering conductive the rectifier $G_{21}$ and thus yielding a voltage across the output resistor $R_{30}$. These changes produce, it is true, also voltages through the windings $P_{12}$ and $P_{13}$, but these voltages cannot render conductive the rectifier $G_{22}$. In a similar manner the changes in the cores $K_{21}$, $K_{31}$ and $K_{32}$ render conductive the rectifier $G_{24}$.

Finally we consider the case in which the coded information changes from (0, 1, 1), into (1, 0, 1). The condition of the device changes into the following diagram:

It appears herefrom that the cores $K_{12}$ and $P_{13}$ have changed from the negative remanence condition into the positive condition and that the cores $K_{21}$ and $K_{23}$ from the positive remanence condition into the negative condition. Across the windings connected to the rectifier $G_{21}$ a voltage occurs, which can render conductive this rectifier, but also two voltages from the windings $N_{12}$ and $N_{13}$ with opposite polarities, so that the resultant voltage does not render the rectifier conductive. The resultant voltage through the windings connected to the rectifier $G_{22}$ does, however, render this rectifier conductive, so that an indication voltage occurs at the terminal U. Thereto contributes the fact that the flux variations in the core $K_{21}$ render the rectifier $G_{23}$ conductive.

From the above example it follows that preferably not all N-windings of the device are connected in series with one another via a rectifier to the terminal U and not all P-windings are connected in series with one another via a further rectifier to the terminal U, since in the last-mentioned example the resultant voltages in the two series combinations would counteract one another, since two cores change over from the positive into the negative remanence condition and two cores change over from the negative remanence condition into the positive condition, so that in such a case a comparatively low indication voltage would occur.

The invention is, of course, not restricted to the case in which the number of code elements is three. In a practical embodiment, intended for use as code indicator for a bookkeeping machine, the number of code elements is six; in this special case the number of code elements of a given kind, for example those indicated above by "1" is each time at the most three. The number of cores is, in this case, thirty, but the number of rectifiers required for reading does not exceed the number four.

It is also not at all required to arrange both the P-windings and the N-windings on the one side and on the other side of the diagonal not occupied by cores in separate series combinations with separate rectifiers. It is already sufficient to arrange this either for the P-windings or for the N-windings.

Figure 5:
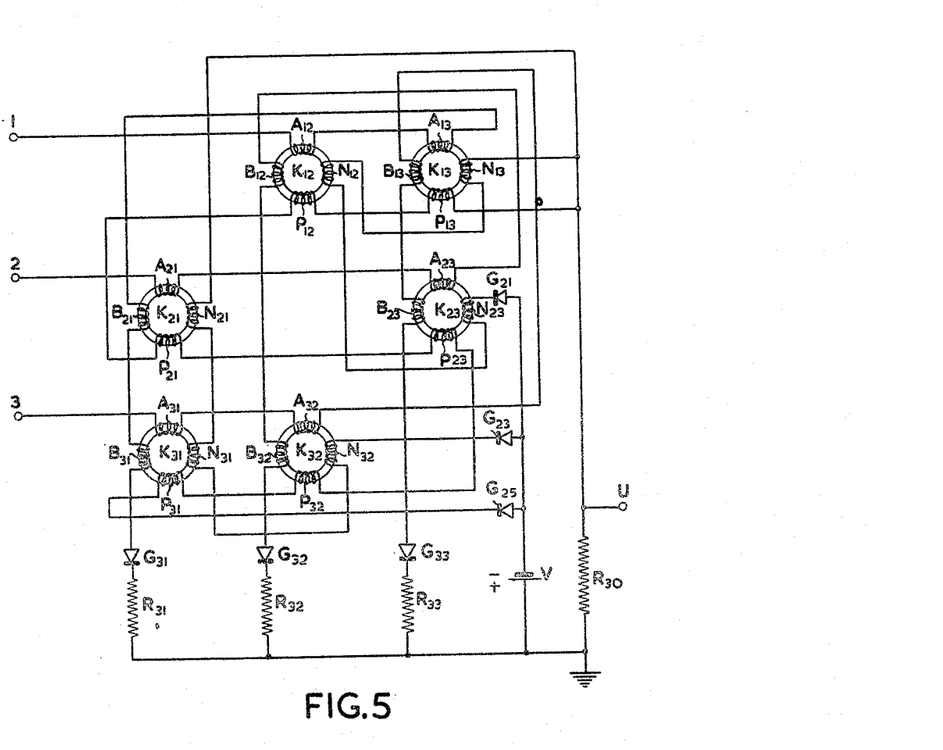
Fig. 5 is a modification of the embodiment of Fig. 4.

Fig. 5 shows a device according to the invention, in which the measure concerned is only applied to the N-windings. Corresponding elements of Figs. 4 and 5 are designated by the same references. The P-windings of the device shown in Fig. 5 are connected, all of them, in series with one another; this series combination is connected on the one hand to the output terminal U and on the other hand through the rectifier $G_{25}$ to the negative terminal of the battery V.

We consider in this case the change-over of the condition:

wherein the cores $K_{12}$ and $K_{13}$ have changed from the negative into the positive remanence condition and the cores $K_{21}$ and $K_{23}$ from the positive into the negative remanence condition. The resultant voltage occurring across the series combination of the P-windings is then, it is true, comparatively small, so that under the action thereof only a comparatively small indication voltage occurs and, as in the device shown in Fig. 4, the rectifier $G_{21}$ does not become conductive, but the flux variation in the core $K_{21}$ produces, across the winding $N_{31}$, a voltage which renders conductive the rectifier $G_{23}$, so that also in this case the change of the coded information produces a considerable indication voltage at the output terminal U.

Figure 6:
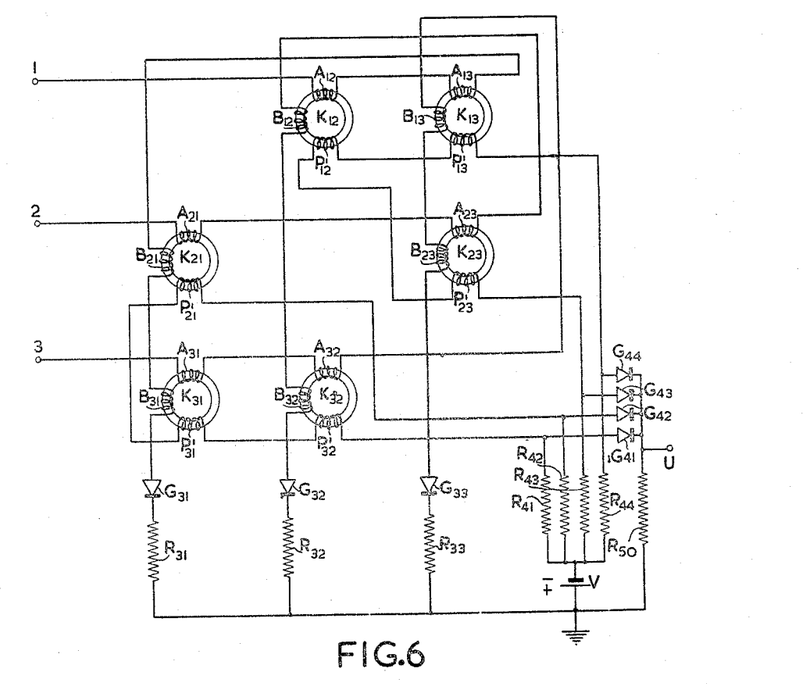
Fig. 6 is a further modification of the embodiment of Fig. 4.

Fig. 6 shows one embodiment of a device according to the invention, in which each time a P-winding operates at the same time as an N-winding. Corresponding elements of the Figs. 4, 5 and 6 are designated by the same references.

The cores lying on one side of the diagonal non-occupied by cores, i.e. the cores $K_{12}$, $K_{13}$, $K_{23}$, are provided, for reading, only with the series-connected windings $P'_{12}$, $P'_{13}$ and $P'_{23}$. The two ends of this series combination are connected via a resistor $R_{43}$ and $R_{44}$ respectively to the negative terminal of a voltage source V. The two resistors are connected via a rectifier $G_{43}$ and $G_{44}$ respectively to a resistor $R_{50}$, from which the output voltage is obtained.

Also the cores lying on the other side of the diagonal non-occupied by cores, i.e. the cores $K_{21}$, $K_{31}$ and $K_{32}$, are provided with the series-connected windings $P'_{21}$, $P'_{31}$ and $P'_{32}$. The ends of this series-combination are connected through resistors $R_{41}$ and $R_{42}$ to the negative terminal of the voltage source V. The resistors $R_{41}$ and $R_{42}$ are connected via rectifiers $G_{41}$ and $G_{42}$ to the resistor $R_{50}$.

Considering the series combination of the windings $P'_{12}$, $P'_{13}$ and $P'_{23}$, a current will flow, in accordance with the direction of the voltage pulse produced across this series combination, either through the circuit formed by this series combination, the resistor $R_{43}$, the rectifier $G_{44}$ and the resistor $R_{50}$ or through the circuit formed by this series combination, the resistor $R_{44}$, the rectifier $G_{43}$ and the resistor $R_{50}$. However, irrespective of the direction of the said voltage pulse, the output U has produced across it a positive output voltage.

In a similar manner the output of the device has produced at it a positive output voltage under the action of a voltage pulse produced in the series combination of the windings $P'_{21}$, $P'_{31}$ and $P'_{32}$, irrespective of the direction of this pulse.

The direct-voltage source V serves, also in this case, to compensate the feeble voltages occurring when the cores are further saturated.

What is claimed is:

1. A device for detecting and indicating variations in coded information represented by the presence or absence of simultaneously occurring unipolar pulses, comprising a plurality of magnetic cores composed of ferromagnetic material having a substantially parallelogram-shaped hysteresis loop with two conditions of remanence, a first plurality of input windings inductively coupled to said cores, a plurality of input conductors for applying unipolar current pulses to said first windings in accordance with said code, each core being driven into one remanence condition by a code pulse applied to its coupled first winding, a plurality of second windings inductively coupled to said cores, means for applying bias pulses to a predetermined number of said second windings simultaneously with the application of said unipolar code pulses to said first windings, said bias pulses operating to drive the cores associated with said predetermined number of second windings into the other remanence condition when a code pulse is absent from a first input winding, and means for deriving an output pulse from said device upon the application of a piece of coded information different from the next preceding piece of coded information applied to the device.

2. A device as claimed in claim 1, wherein said one remanence condition has an amplitude which is substantially twice that of the other remanence condition.

3. A device as claimed in claim 1, wherein the number of magnetic cores is equal to the number of input conductors.

4. A device for detecting and indicating variations in coded information represented by the presence or absence of simultaneously occurring unipolar pulses, comprising a plurality of magnetic cores composed of ferromagnetic material having a substantially parallelogram-shaped hysteresis loop with two conditions of remanence, a first plurality of input windings inductively coupled to said cores, a plurality of input conductors for applying unipolar current pulses to said first windings in accordance with said code, the number of input conductors being equal to the number of magnetic cores each core being driven into one remanence condition by a code pulse applied to its coupled first winding, a plurality of second windings inductively coupled to said cores, said second windings being connected in series with each other, means for applying bias pulses to all of said second windings simultaneously with the application of said unipolar code pulses to said first windings, said bias pulses operating to drive the magnetic cores into the other remanence condition when a code pulse is absent from a first input winding, and means for deriving an output pulse from said device upon the application thereto of a piece of coded information different from the next preceding applied piece of coded information.

5. A device as set forth in claim 4, wherein said one remanence condition has an amplitude which is substantially twice that of the other remanence condition.

6. A device for detecting and indicating variations in coded information represented by the presence or absence of simultaneously occurring unipolar pulses, comprising a plurality of magnetic cores composed of ferromagnetic material having a substantially parallelogram-shaped hysteresis loop with two conditions of remanence, a first plurality of input windings inductively coupled to said cores, a plurality of input conductors for applying unipolar current pulses to said first windings in accordance with said code, the number of input conductors being equal to the number of magnetic cores each core being driven into one remanence condition by a code pulse applied to its coupled first winding, a plurality of second windings inductively coupled to said cores, said second windings being connected in series with each other, means for applying bias pulses to all of said second windings simultaneously with the application of said unipolar code pulses to said first windings, said bias pulses operating to drive the magnetic cores into the other remanence condition when a code pulse is absent from a first input winding, said one remanence condition having an amplitude which is substantially twice that of the other remanence condition, a plurality of third windings inductively coupled to said cores, each of said third windings having one end connected to an output conductor and the other end connected to a point at constant potential, and a plurality of fourth conductors connected in series and inductively coupled to said cores, one end of said series connection being connected to said output conductor and the other end being coupled to said point at constant potential.

7. A device as set forth in claim 6, said third and fourth windings being wound on said cores in opposite senses to each other, said third windings producing an output voltage on said output conductor when any one of said cores is driven into said one remanence condition, and said fourth windings producing an output voltage on said output conductor when any one of said cores is driven into the other remanence condition.

8. A device for detecting and indicating variations in coded information represented by the presence or absence of simultaneously occurring unipolar pulses, comprising a plurality of magnetic cores composed of ferromagnetic material having a substantially parallelogram-shaped hysteresis loop with two conditions of remanence, a first plurality of input windings inductively coupled to said cores, a plurality of input conductors for applying unipolar current pulses to said first windings in accordance with said code, the number of input conductors being equal to the number of magnetic cores, each core being driven into one remanence condition by a code pulse applied ot its coupled first winding, a plurality of second windings inductively coupled to said cores, said second windings being connected in series with each other, means for applying bias pulses to all of said second windings simultaneously with the application of said unipolar code pulses to said first windings, said bias pulses operating to drive the magnetic cores into the other remanence condition when a code pulse is absent from a first input winding, said means being coupled to said input conductors and operating in response to the application of code pulses, and means for deriving an output pulse from said device upon the application thereto of a piece of coded information different from the next preceding applied piece of coded information.

9. A device as set forth in claim 8, said one remanence condition having an amplitude which is substantially twice that of the other remanence condition.

10. A device for detecting and indicating variations in coded information represented by the presence or absence of simultaneously occurring unipolar pulses, comprising a plurality of magnetic cores composed of ferromagnetic material having a substantially parallelogram-shaped hysteresis loop with two conditions of remanence, a first plurality of input windings inductively coupled to said cores, a plurality of input conductors for applying unipolar current pulses to said first windings in accordance with said code, the number of input conductors being equal to the number of magnetic cores, each core being driven into one remanence condition by a code pulse applied to its coupled first winding, a plurality of second windings inductively coupled to said cores, said second windings being connected in series with each other, means for applying bias pulses to all of said second windings simultaneously with the application of said unipolar code pulses to said first windings, said bias pulses operating to drive the magnetic cores into the other remanence condition when a code pulse is absent from a first input winding, one end of said series connection being connected to a point in constant potential, the other end of said series connection being connected to an output conductor, and one end of each of said input windings being connected to said point at constant potential, the other end of each of said input windings being connected to said output conductor.

11. A device for detecting and indicating variations in coded information represented by the presence or absence of simultaneously occurring unipolar pulses, each piece of information consisting of a plurality of code elements, comprising a plurality of magnetic cores composed of ferromagnetic material having a substantially parallelogram-shaped hysteresis loop with two conditions of remanence, said cores being arranged in a bidimensional array of rows and columns, the number of rows and columns being equal to the number of code elements, said cores being located on both sides of one diagonal of said array, said diagonal containing no cores, a first plurality of input windings inductively coupled to said cores, a plurality of input conductors equal in number to said code elements for applying unipolar current pulses to said first windings in accordance with said code, the pulses of each element being applied to the first windings of a respective row in series, each core being driven into one remanence condition by a code pulse applied to its associated first winding, a plurality of second windings inductively coupled to said cores, the second windings of each column being connected in series with the first windings of a respective row, whereby the second windings of a column have pulses applied thereto simultaneously with the application of pulses to a respective row, the cores of each column being driven into the other remanence condition by a pulse applied to the second windings associated therewith when a code pulse is absent from the first input windings associated therewith, and means for deriving an output pulse from said device upon the application thereto of a piece of coded information different from the next preceding applied piece of coded information.

12. A device as claimed in claim 11, the magnitude of said one remanence condition being substantially twice that of said other remanence condition.

13. A device for detecting and indicating variations in coded information represented by the presence or absence of simultaneously occurring unipolar pulses, each piece of information consisting of a plurality of code elements, comprising a plurality of magnetic cores composed of ferromagnetic material having a substantially parallelogram-shaped hysteresis loop with two conditions of remanence, said cores being arranged in a bidimensional array of rows and columns, the number of rows and columns being equal to the number of code elements, said cores being located on both sides of one diagonal of said array, said diagonal containing no cores, a first plurality of input windings inductively coupled to said cores, a plurality of input conductors equal in number to said code elements for applying unipolar current pulses to said first windings in accordance with said code, the pulses of each element being applied to the first windings of a respective row in series, each core being driven into one remanence condition by a code pulse applied to its associated first winding, a plurality of second windings inductively coupled to said cores, the second windings of each column being connected in series with the first windings of a respective row, whereby the second windings of a column have pulses applied thereto simultaneously with the application of pulses to a respective row, the cores of each column being driven into the other remanence condition by a pulse applied to the second windings associated therewith when a code pulse is absent from the first input windings associated therewith, said one remanence condition having an amplitude which is substantially twice that of the other remanence condition, a plurality of third windings inductively coupled to said cores, the third windings on each side of said diagonal being separately connected in series, one end of each series connection being coupled to an output conductor and the other end being coupled to a point at constant potential, and a plurality of fourth windings inductively coupled to said cores, the fourth windings on each side of said diagonal being separately connected in series, one end of each series connection being coupled to said output conductor and the other end being coupled to said point at constant potential.

14. A device for detecting and indicating variations in coded information represented by the presence or absence of simultaneously occurring unipolar pulses, each piece of information consisting of a plurality of code elements, comprising a plurality of magnetic cores composed of ferromagnetic material having a substantially parallelogram-shaped hysteresis loop with two conditions of remanence, said cores being arranged in a bidimensional array of rows and columns, the number of rows and columns being equal to the number of code elements, said cores being located on both sides of one diagonal of said array, said diagonal containing no cores, a first plurality of input windings inductively coupled to said cores, a plurality of input conductors equal in number to said code elements for applying unipolar current pulses to said first windings in accordance with said code, the pulses of each element being applied to the first windings of a respective row in series, each core being driven into one remanence condition by a code pulse applied to its associated first winding, a plurality of second windings inductively coupled to said cores, the second windings of each column being connected in series with the first windings of a respective row, whereby the second windings of a column have pulses applied thereto simultaneously with the application of pulses to a respective row, the cores of each column being driven into the other remanence condition by a pulse applied to the second windings associated therewith when a code pulse is absent from the first input windings associated therewith, said one remanence condition having an amplitude which is substantially twice that of the other remanence condition, a plurality of third windings inductively coupled to said cores, all of said windings being connected in series, one end of said series connection being coupled to an output conductor and the other end being coupled to a point at constant potential, and a plurality of fourth windings inductively coupled to said cores, the fourth windings on each side of said diagonal being separately connected in series, one end of each series connection being coupled to said output conductor and the other end being coupled to said point at constant potential.

15. A device for detecting and indicating variations in coded information represented by the presence or absence of simultaneously occurring unipolar pulses, each piece of information consisting of a plurality of code elements, comprising a plurality of magnetic cores composed of ferromagnetic material having a substantially parallelogram-shaped hysteresis loop with two conditions of remanence, said cores being arranged in a bidimensional array of rows and columns, the number of rows and columns being equal to the number of code elements, said cores being located on both sides of one diagonal of said array, said diagonal containing no cores, a first plurality of input windings inductively coupled to said cores, a plurality of input conductors equal in number to said code elements for applying unipolar current pulses to said first windings in accordance with said code, the pulses of each element being applied to the first windings of a respective row in series, each core being driven into one remanence condition by a code pulse applied to its associated first winding, a plurality of second windings inductively coupled to said cores, the second windings of each column being connected in series with the first windings of a respective row, whereby the second windings of a column have pulses applied thereto simultaneously with the application of pulses to a respective row, the cores of each column being driven into the other remanence condition by a pulse applied to the second windings associated therewith when a code pulse is absent from the first input windings associated therewith, said one remanence condition having an amplitude which is substantially twice that of the other remanence condition, a plurality of third windings inductively coupled to said cores, the third windings on each side of said diagonal being separately connected in series, each end of each series connection being coupled to a point of constant potential through an impedance, with each end also being coupled to an output conductor.

References Cited in the file of this patent

UNITED STATES PATENTS

| | | |
|---|---|---|
| 2,648,829 | Ayres | Aug. 11, 1953 |
| 2,766,420 | Ramey | Oct. 9, 1956 |